United States Patent Office 3,256,310
Patented June 14, 1966

3,256,310
SPIROCYCLIC BORATE ESTERS
Theodor Weil, New Brunswick, N.J., assignor to FMC Corporation, New York, N.Y., a corporation of Delaware
No Drawing. Filed Nov. 8, 1962, Ser. No. 236,442
12 Claims. (Cl. 260—462)

This invention relates to the preparation of novel boron compounds, and, in particular, it relates to novel spirocyclic complex esters of boric acid.

Simple boric acid esters have not previously been found useful in industrial applications because of their ease of hydrolysis. Such hydrolysis-susceptible compounds could not be employed, for example, as agricultural fungicides or bactericides, where they can be hydrolyzed by the soil moisture and completely destroyed in a short time.

I have discovered a novel class of hydrolytically stable spirocyclic boric acid complex esters containing tetracoordinated boron. These novel non-polymeric esters have the formula

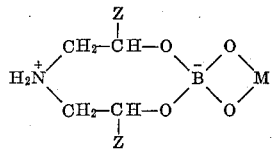

wherein each Z is hydrogen or lower alkyl and M is a substituted ethylene or trimethylene group or an aromatic ring connected in the ortho position.

Preferably, M is substituted as follows: when M is

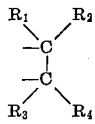

$R_1$ and $R_3$ may each be hydrogen, alkyl, or aryl, $R_2$ may be hydrogen, alkyl, aryl, or carboxyalkyl, and $R_4$ may be hydrogen, alkyl, aryl, alkoxyalkyl, alkenyloxyalkyl, alkoxycarbonyl, aryloxyalkyl, or mercaptoalkyl: when M is

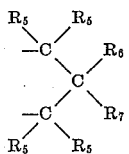

the $R_5$ radicals and $R_6$ may each be hydrogen or alkyl, $R_7$ may be hydrogen, alkyl, alkenyloxyalkyl, alkoxycarbonyl, alkoxyalkyl, alkanamido, or $R_6$ and $R_7$ may be joined in a single heterocyclic radical; and when M is

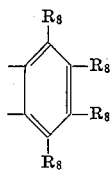

the $R_8$ radicals may each be hydrogen or lower alkyl.

I prepare my novel spirocyclic esters by reacting boric acid or boric anhydride with a 1,2- or 1,3-diol, and with a dialkanolamine in a liquid phase, preferably in the presence of an inert organic liquid. This condensation reaction is performed either by initially mixing all three of these reactants together and then heating the mixture to reaction temperature or by first reacting the boron compound with either the amine or the alcohol separately, then adding the third reactant.

The reaction is conducted at an elevated temperature and is continued until three moles of water is formed for each mole of product. The water should be continually removed throughout the entire reaction. Upon completion of the reaction, the final product is separated from the liquid medium either as an oil, as a glass, or in the form of crystals. If the amine-boric acid intermediate condensate is first prepared, it will not thereafter form esters by further reaction with a monohydric alcohol. I find that the alcohol reactant must be dihydric. Furthermore, I also find that a tertiary amine cannot be used to produce these spirocyclic esters, so that an N-alkyl dialkanolamine, for example, is totally unsuitable.

My reaction sequence can take the following course:

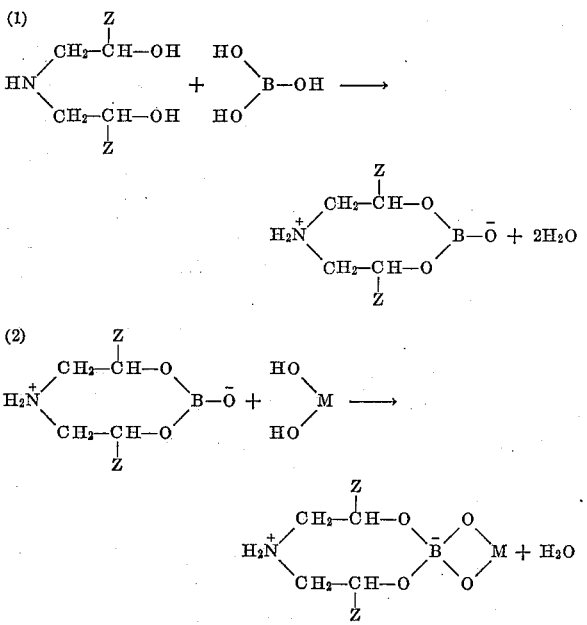

wherein Z and M have the scope previously assigned. The reaction sequence may be changed by adding the diol prior to the dialkanolamine or together with it.

Removal of the water can be performed in a number of different ways known to the art. A common method of water removal is by azeotropic distillation during the reaction using an organic water-immiscible liquid carrier for the reaction. Suitable azeotrope-forming liquids include chloroform, hexane, heptane, benzene, toluene, xylene, or other inert, organic liquid. The azeotrope mixture can be readily separated, for example, in a Dean-Stark apparatus, and the liquid carrier can be returned to the reaction vessel. The water may also be removed by azeotropic distillation using an organic water-miscible liquid, such as sec-butanol. In this case, fresh liquid may have to be added during the reaction to replace that which is distilled off.

As stated above, either boric acid or boric anhydride may be employed as one of the reactants. Only half a mole of the anhydride is needed, as shown below:

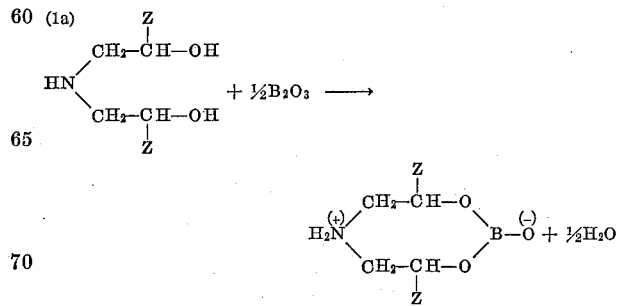

Reaction of this cyclic intermediate with the diol will be the same as reaction (2) above.

Such dialkanolamines as diethanolamine and diisopropanolamine are suitable for this reaction. The only limitation on the selection of this reactant is that the nitrogen atom is not further substituted. As stated earlier, I have discovered that tertiary amines are unsatisfactory for the formation of my tetra-coordinated spirocyclic compounds. The alkanol segments, on the other hand, may be substituted by any radical which will not interfere with the reaction. The preferred substituents are hydrogen and lower alkyl groups.

If the diol is reacted with boric acid or boric anhydride first, the intermediate will be

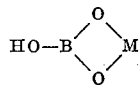

This intermediate is then reacted with the dialkanolamine. One mole of water is split off to form the corresponding complex ester.

According to this invention, acceptable diols include ethylene glycol, 1,2-propanediol, 1,3-propanediol, 1,3-butanediol, 2,3-butanediol, 3-(o-tolyloxy)-1,2-propanediol, monoolein, 2,2-diethyl-1,3-propanediol, 2-butyl-2-ethyl-1,3 - propanediol, 2,2,4-trimethyl-1,3-pentanediol, 2,2-dimethyl-1,3-propanediol (neopentyl glycol), 2,2-dimethyl-1,3-butanediol, 2,3-dimethyl-2,3-butanediol, 2-ethyl - 1,3-hexanediol, benzopinacol, 2-methyl - 2,4 - pentanediol, 2-phenyl-oxazoline-4,4-dimethanol, 4-tert.-butyl - pyrocatechol, 3-isopropyl-6-methyl-pyrocatechol, pyrocatechol, and dibutyl tartrate. This list should not be considered as a limitation on the number of diols which can be employed in this invention.

This condensation reaction requires no special operating conditions to obtain quantitative yields, since the condensation products form quite readily. The reaction is preferably performed at the reflux temperature of the organic liquid-water mixture, or if no liquid is used, then at the boiling point of water, at the operating pressure.

The following examples are illustrative of the invention.

EXAMPLE 1

A mixture of 30.9 grams (0.5 mole) of boric acid, 52.5 grams (0.5 mole) of diethanolamine and 200 ml. of toluene was added to a reaction flask equipped with a Dean-Stark apparatus. The mixture was heated to reflux and water of reaction began to form. When approximately 18 mls. of water was collected, 52 grams (0.5 mole) of neopentyl glycol was added and reflux was continued. Another 9 mls. of water separated out. The reaction mixture was cooled and crystallization was initiated by seeding. The crystals were washed in 200 ml. of ether, filtered and dried. A white crystalline product was obtained with a yield of 93 grams (85.8% yield). The product had a melting point of 125–126° C.

*Analysis.*—Calcd. for $C_9H_{20}O_4NB$: C, 49.80; H, 9.29; N, 6.46; B, 4.99. Found: C, 49.70; H, 9.49; N, 6.39; B, 5.16.

EXAMPLE 2

Using the same apparatus as in Example 1, 20.6 grams (0.33 mole) of boric acid, 35 grams (0.33 mole) of diethanolamine, and 55.4 grams (0.33 mole) of 4-tert.-butyl catechol in 200 ml. of toluene were mixed together. The reaction mixture was maintained at reflux temperature until 17 ml. of water had been collected in the trap. Upon crystallization and separation of the crystals, 91 grams (98.2% of theoretical) of a compound melting at 224–225° C. was obtained.

*Analysis.*—Calcd. for $C_{14}H_{22}O_4NB$: C, 60.24; H, 7.81; N, 5.01; B, 3.88. Found: C, 60.46; H, 7.78; N, 5.01; B, 3.76.

EXAMPLE 3

The procedure in Example 1 was changed slightly by reacting the diol with boric acid first. A mixture of 178.0 grams (0.5 mole) of monoolein, 30.9 grams (0.5 mole) of boric acid, and 300 ml. of toluene was refluxed as in Example 1. After 27 ml. of water had been collected in the Dean-Stark trap, 52.5 grams (0.5 mole) of diethanolamine was added. Reflux was continued until a further 7 ml. of water had been collected. A homogeneous solution was obtained. The toluene was removed under reduced pressure at 90° C. whereupon a wax-like solid began to form.

*Analysis.*—Calcd. for $C_{25}H_{48}O_6NB$: B, 2.30; N, 2.99; iodine No.: 51.81. Found: B, 2.40; N, 3.03; iodine No.: 54.07.

EXAMPLE 4

The following tables list various complex borate esters which have been prepared using two different dialkanolamines, diethanolamine and diisopropanolamine and a variety of diols. Analyses and melting points are included.

A. ESTERS PREPARED WITH DIETHANOLAMINE

| Diols | Formula | Melting Point, ° C. | C Calc. | C Found | H Calc. | H Found | N Calc. | N Found | B Calc. | B Found |
|---|---|---|---|---|---|---|---|---|---|---|
| Ethylene glycol | $C_6H_{14}O_4NB$ | Low melting glass | 41.18 | 42.19 | 8.06 | 8.09 | | | | |
| 1,2-propanediol | $C_7H_{16}O_4NB$ | do | 44.48 | 46.45 | 8.53 | 8.84 | | | | |
| 3-mercapto-1,2-propanediol | $C_7H_{16}O_4NBS$ | Glass | 38.02 | 41.82 | 7.30 | 7.71 | | | | |
| 2,3-butanediol | $C_8H_{18}O_4NB$ | 51–53 | | | | | 6.90 | 6.85 | 5.33 | 5.22 |
| Monoacetin | $C_9H_{18}O_6NB$ | Glass | 43.74 | 45.62 | 7.35 | 8.05 | | | | |
| Pyrocatechol | $C_{10}H_{14}O_4NB$ | Dec. above 250 | | | | | 6.28 | 6.45 | 4.85 | 4.60 |
| 2-methyloxazoline-4,4-dimethanol | $C_{10}H_{19}O_5N_2B$ | Glass | 46.54 | 47.68 | 7.42 | 7.88 | 10.86 | 9.64 | | |
| 2-methyl-2,4-pentanediol | $C_{10}H_{22}O_4NB$ | 69–70 | 51.97 | 51.40 | 9.60 | 10.00 | 6.06 | 5.99 | 4.68 | 4.57 |
| Pinacol | $C_{10}H_{22}O_4NB$ | 102–103 | | | | | 6.06 | 6.13 | 4.68 | 4.92 |
| 2,2-dimethyl-1,3-butanediol | $C_{10}H_{22}O_4NB$ | 80–81 | | | | | 6.06 | 6.12 | 4.68 | 4.81 |
| 3-methyl-2,4-pentanediol | $C_{10}H_{22}O_4NB$ | 65–67 | | | | | 6.06 | 5.97 | 4.68 | 4.90 |
| 2,2-diethyl-1,3-propanediol | $C_{11}H_{24}O_4NB$ | 125–126 | 53.91 | 54.25 | 9.87 | 9.91 | 5.72 | 5.74 | 4.42 | 4.67 |
| 2,2,4-trimethyl-1,3-pentanediol | $C_{12}H_{26}O_4NB$ | 102–104 | 55.60 | 55.74 | 10.12 | 10.27 | 5.41 | 5.41 | 4.18 | 4.42 |
| 2-ethyl-1,3-hexanediol | $C_{12}H_{26}O_4NB$ | 95 | 55.60 | 55.86 | 10.11 | 10.02 | 5.41 | 5.41 | 4.18 | 4.39 |
| 2-ethyl-2-allyloxymethyl-1,3-propanediol | $C_{13}H_{26}O_5NB$ | 95–97 | 54.37 | 54.43 | 9.13 | 9.56 | | | | |
| 2-butyl-2-ethyl-1,3-propanediol | $C_{13}H_{28}O_4NB$ | 119–120 | 57.17 | 56.32 | 10.34 | 10.14 | 5.13 | 5.31 | 3.96 | 4.09 |
| 3-methyl-6-isopropylcatechol | $C_{14}H_{22}O_4NB$ | 211–212 | 60.24 | 60.50 | 7.95 | 7.96 | 5.01 | 4.93 | 3.88 | 3.92 |
| 3-(o-tolyloxy)-1,2-propanediol | $C_{14}H_{22}O_5NB$ | Glass | 56.97 | 56.43 | 7.52 | 7.40 | 4.75 | 4.45 | 3.67 | 3.51 |
| 5-ethyl-3-methyl-2,4-heptanediol | $C_{14}H_{30}O_4NB$ | 113–115 | 58.55 | 58.16 | 10.53 | 10.96 | | | | |
| 2-phenyloxazoline-4,4-dimethanol | $C_{15}H_{21}O_5N_2B$ | 110 | | | | | 8.75 | 7.91 | 3.38 | 2.99 |
| Monobenzal pentaerythritol | $C_{16}H_{24}O_6NB$ | Glass | 56.99 | 57.01 | 7.18 | 7.31 | | | | |
| Dibutyl tartrate | $C_{16}H_{30}O_8NB$ | do | | | | | 3.74 | 4.18 | 2.89 | 2.88 |
| 2-heptanamido-2-methyl-1,3-propanediol | $C_{16}H_{33}O_5N_2B$ | do | | | | | 8.14 | 8.11 | 3.15 | 3.72 |
| 2-nonyloxazoline-4,4-dimethanol | $C_{18}H_{35}O_5N_2B$ | do | 58.38 | 55.60 | 9.53 | 9.60 | 7.57 | 7.52 | | |
| Benzopinacol | $C_{30}H_{30}O_4NB$ | 82–83 | 75.16 | 75.44 | 6.27 | 6.75 | | | | |

B. ESTERS PREPARED WITH DIISOPROPANOLAMINE

| Diols | Formula | Melting Point, °C. | C | | H | | N | | B | |
|---|---|---|---|---|---|---|---|---|---|---|
| | | | Calc. | Found | Calc. | Found | Calc. | Found | Calc. | Found |
| Ethylene glycol | $C_8H_{18}O_4NB$ | 147–148 | 47.32 | 47.79 | 8.94 | 9.54 | | | | |
| Neopentyl glycol | $C_{11}H_{24}O_4NB$ | Glass | 53.91 | 53.49 | 9.81 | 9.79 | | | | |
| Pyrocatechol | $C_{12}H_{18}O_4NB$ | 90–92 | 57.40 | 59.03 | 7.23 | 7.92 | | | | |
| 3-isopropyl-6-methyl catechol | $C_{16}H_{26}O_4NB$ | 130–133 | 62.55 | 62.36 | 8.54 | 8.69 | | | | |
| 4-tert.-butyl catechol | $C_{16}H_{26}O_4NB$ | 217–219 | 62.55 | 63.10 | 8.54 | 8.91 | | | | |

EXAMPLE 5

The compounds, as prepared by any of the above methods using the following amines and diols, were tested for fungicidal effect on *Aspergillus niger*, *Pullularia pullulans*, *Penicillium expansum* and *Alternaria solani*. These compounds were also tested for effectiveness in killing bacteria on *Bacillus mycoides* and *Aerobacter areogenes*.

Item 13, the boric acid ester of diisopropanolamine and pyrocatechol

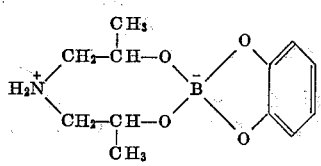

FUNGICIDAL AND BACTERICIDAL TESTS OF BORIC ACID ESTERS PREPARED FROM DIFFERENT DIALKANOLAMINES AND DIOLS

| Compound | | Fungicidal Tests, mm. | | | | Bactericidal Tests, mm. | |
|---|---|---|---|---|---|---|---|
| Dialkanolamine | Diols | A. niger | P. pullulans | Pen. expansum | Alt. solani | B. mycoides | A. aerogenes |
| Diethanolamine | Neopentyl glycol | 5 | 5 | 5 | 4 | 8 | 7 |
| Do | 2,3-butanediol | 10 | 7 | 4 | 2 | 10 | 12 |
| Do | Pyrocatechol | 5 | 5 | 2 | (1) | 9 | 8 |
| Do | 2,2-diethyl-1,3-propanediol | 2 | 6 | 7 | 5 | 5 | 5 |
| Do | 2-ethyl-2-butyl-1,3-propanediol | 6 | 9 | 4 | 12 | 6 | 10 |
| Do | 2,2,4-trimethyl-1,3-pentanediol | 9 | 8 | 4 | 15 | 4 | 7 |
| Do | 2,2-dimethyl-1,3-butanediol | 7 | 15 | 15 | 5 | 5 | 6 |
| Do | Pinacol | 4 | 5 | 11 | 5 | 6 | 7 |
| Do | 2-ethyl-1,3-hexanediol | 15 | 14 | 15 | 13 | 5 | 7 |
| Do | 2-methyl-2,4-pentanediol | 5 | 10 | 10 | 5 | 7 | 10 |
| Diisopropanolamine | Neopentyl glycol | 8 | 12 | 5 | 4 | 7.5 | 5 |
| Diethanolamine | 3-isopropyl-6-methyl catechol | 10 | 20 | 20 | (2) | 8 | 2 |
| Diisopropanolamine | Pyrocatechol | 12 | 17 | 10 | (2) | 14 | 10 |
| Diethanolamine | 3-tert.-butyl catechol | 12 | 20 | 10 | 25 | 8 | 5 |

[1] No inhibition.  [2] Complete inhibition.

Items 2, 9, 12, 13 and 14 in the immediately preceding table have the following structural formulae:

Item 2, the boric acid ester of diethanolamine and 2,3-butanediol

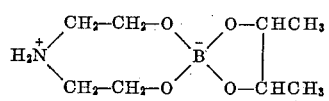

Item 9, the boric acid ester of diethanolamine and 2-ethyl-1,3-hexanediol

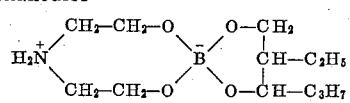

Item 12, the boric acid ester of diethanolamine and 3-isopropyl-6-methyl catechol

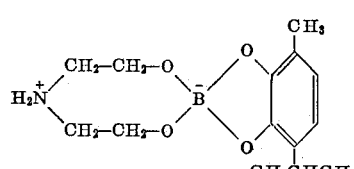

Item 14, the boric acid ester of diethanolamine and 3-tert.-butyl catechol

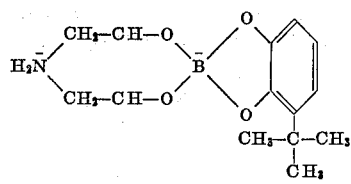

The above test results, showing the utility of these compounds, were obtained by placing 0.25 gram of the test compound inside a ring of 10–12 mm. (inside diameter) drawn in the center of a plate containing fungus or bacteria cultures. The fungus culture was incubated at 20° C. for 72 hours; the bacteria culture was incubated at 37° C. for 24–36 hours. After incubation, if a clear zone resulted, showing that the organism did not grow, the test compound was said to be toxic to the organism. The distance of that clear zone from the nearest culture growth to the center of the ring was measured and reported; for example, a non-toxic sample or a blank standard would have a measurement of zero or "no inhibition," while a sample of extremely high toxicity would result in "complete inhibition."

The amino-boric acid intermediate has also been found to have activity as a bactericide and fungicide. For example, the diethanolamine-boric acid cyclic compound was tested according to the above method with the following results:

| | Mm. |
|---|---|
| A. niger | 5 |
| P. pullulans | 10 |
| Pen. expansum | 12 |
| Alt. solani | 8 |
| B. mycoides | 12 |
| A. aerogenes | 13 |

These novel boric acid esters are stable to hydrolytic attack. They are generally water-soluble and may conveniently be applied industrially as a bactericide or fungicide in a water solution as well as in an inert organic solvent.

Having fully described my invention, I claim:

1. A spirocyclic borate ester of the formula

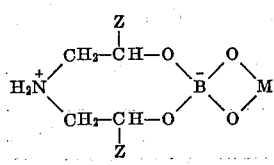

in which Z is selected from the group consisting of hydrogen and lower alkyl and M is selected from the group consisting of (a) ethylene groups of the formula

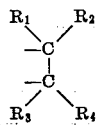

in which $R_1$ and $R_3$ are selected from the group consisting of hydrogen, alkyl, phenyl, $R_2$ is selected from the group consisting of hydrogen, alkyl, phenyl, and carboxyalkyl, and $R_4$ is selected from the group consisting of hydrogen, alkyl, phenyl, alkoxyalkyl, alkoxycarbonyl, aryloxyalkyl, and mercaptoalkyl, (b) trimethylene groups of the formula

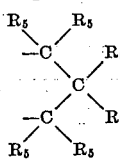

in which $R_5$ and $R_6$ are selected from the group consisting of hydrogen and alkyl, $R_7$ is selected from the group consisting of hydrogen, alkyl, alkoxyalkyl, alkenyloxyalkyl, alkoxycarbonyl, and alkanamido, and (c) arylene groups of the formula

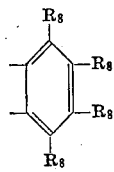

in which $R_8$ is selected from the group consisting of hydrogen and lower alkyl.

2. A spirocyclic borate ester of claim 1 in which M is an ethylene group of formula (a).

3. A spirocyclic borate ester of claim 1 in which M is a trimethylene group of formula (b).

4. A spirocyclic borate ester of claim 1 in which M is an arylene group of formula (c).

5. A spirocyclic borate ester of the formula

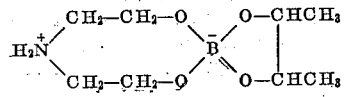

6. A spirocyclic borate ester of the formula

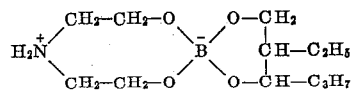

7. A spirocyclic borate ester of the formula

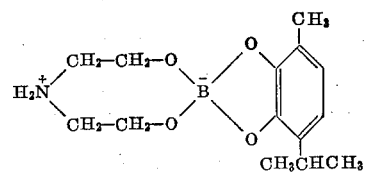

8. A spirocyclic borate ester of the formula

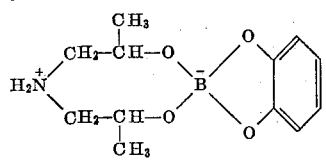

9. A spirocyclic borate ester of the formula

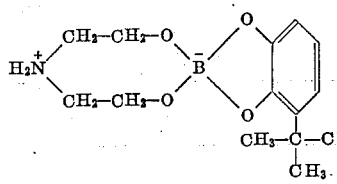

10. A method of preparing spirocyclic borate esters which comprises heating a mixture of (a) a boron compound selected from the group consisting of boric acid and boric anhydride, (b) a dialkanolamine of the formula

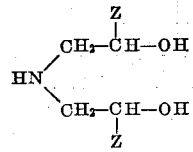

in which Z is selected from the group consisting of hydrogen and lower alkyl, and (c) a diol of the formula

in which M is selected from the group consisting of (1) ethylene groups of the formula

in which $R_1$ and $R_3$ are selected from the group consisting of hydrogen, alkyl, and phenyl, $R_2$ is selected from the group consisting of hydrogen, alkyl, phenyl, and carboxyalkyl, and $R_4$ is selected from the group consisting of hydrogen, alkyl, phenyl, alkoxyalkyl, alkoxycarbonyl, aryloxyalkyl, and mercaptoalkyl, (2) trimethylene groups of the formula

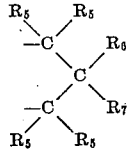

in which $R_5$ and $R_6$ are selected from the group consisting of hydrogen and alkyl, $R_7$ is selected from the group consisting of hydrogen, alkyl, alkoxyalkyl, alkenyloxyalkyl, alkoxycarbonyl, and alkanamido, and
(3) arylene groups of the formula

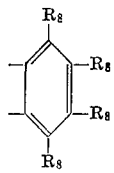

in which $R_8$ is selected from the group consisting of hydrogen and lower alkyl,
and removing water formed during the reaction.

11. A method of preparing spirocyclic borate esters which comprises heating a mixture of
(a) a diol of the formula

in which M is selected from the group consisting of
(1) ethylene groups of the formula

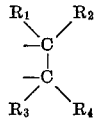

in which $R_1$ and $R_3$ are selected from the group consisting of hydrogen, alkyl, and phenyl, $R_2$ is selected from the group consisting of hydrogen, alkyl, phenyl, and carboxyalkyl, and $R_4$ is selected from the group consisting of hydrogen, alkyl, phenyl, alkoxyalkyl, alkoxycarbonyl, aryloxyalkyl, and mercaptoalkyl, (2) trimethylene groups of the formula

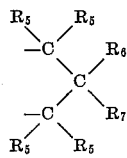

in which $R_5$ and $R_6$ are selected from the group consisting of hydrogen and alkyl, $R_7$ is selected from the group consisting of hydrogen, alkyl, alkoxyalkyl, alkenyloxyalkyl, alkoxycarbonyl, and alkanamido, and
(3) arylene groups of the formula

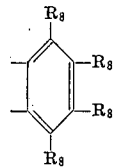

in which $R_8$ is selected from the group consisting of hydrogen and lower alkyl, and
(b) an organic boric acid condensation product of the formula

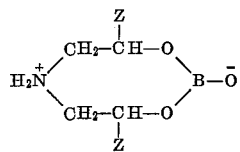

in which Z is selected from the group consisting of hydrogen and lower alkyl,
and removing water formed during the reaction.

12. A method of preparing spirocyclic borate esters which comprises heating a mixture of
(a) a dialkanolamine of the formula

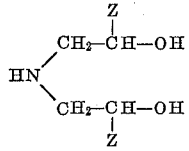

in which Z is selected from the group consisting of hydrogen and lower alkyl, and
(b) an organic boric acid condensation product of the formula

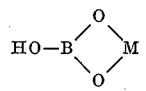

in which M is selected from the group consisting of
(1) ethylene groups of the formula

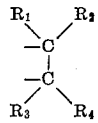

in which $R_1$ and $R_3$ are selected from the group consisting of hydrogen, alkyl, and phenyl, $R_2$ is selected from the group consisting of hydrogen, alkyl, phenyl, and carboxyalkyl, and $R_4$ is selected from the group consisting of hydrogen, alkyl, phenyl, alkoxyalkyl, alkoxycarbonyl, aryloxyalkyl, and mercaptoalkyl, (2) trimethylene groups of the formula

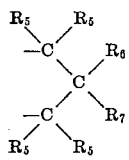

in which $R_5$ and $R_6$ are selected from the group consisting of hydrogen and alkyl, $R_7$ is selected from the group consisting of hydrogen, alkyl, alkoxyalkyl, alkenyloxyalkyl, alkoxycarbonyl, and alkanamido, and
(3) arylene groups of the formula

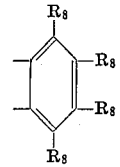

in which $R_8$ is selected from the group consisting of hydrogen and lower alkyl,
and removing water formed during the reaction.

References Cited by the Examiner

Lappert, Chem. Reviews, vol. 56, p. 978 (1956).

CHARLES B. PARKER, *Primary Examiner.*

LEON D. ROSDOL, *Examiner.*